S. V. TSANOFF.
MOLD FOR BRICKS AND BLOCKS.
APPLICATION FILED MAR. 28, 1919.
1,338,468.
Patented Apr. 27, 1920.
2 SHEETS—SHEET 1.
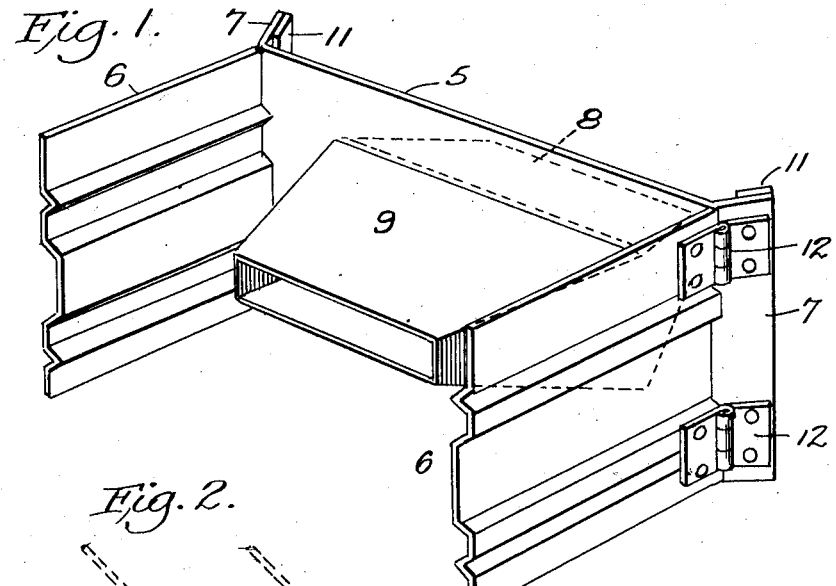
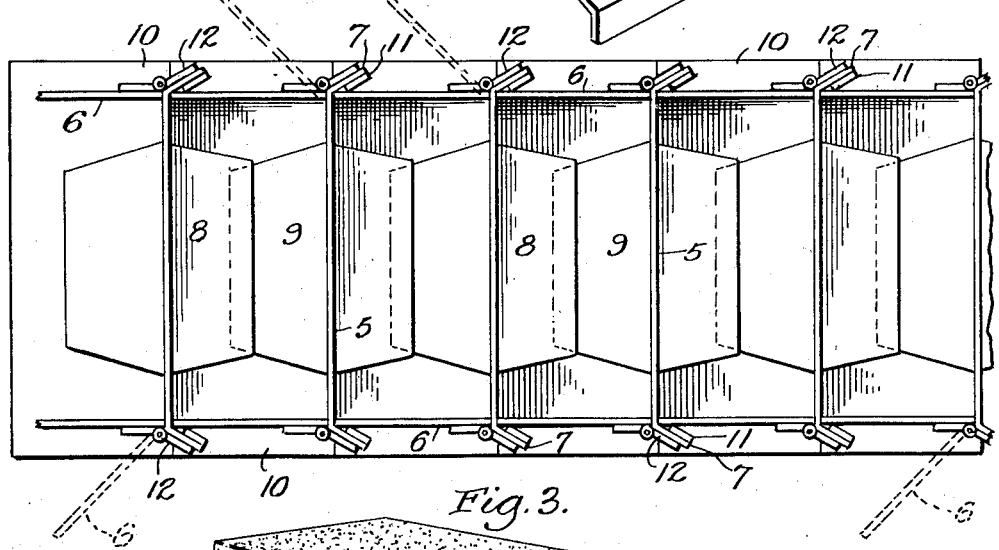
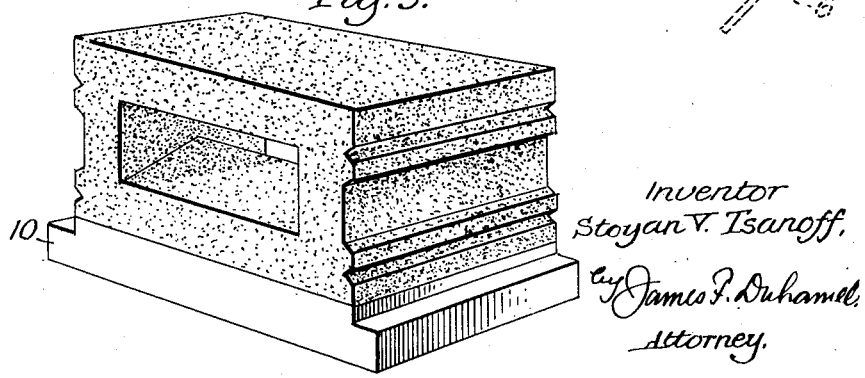
Inventor
Stoyan V. Tsanoff,
By James F. Duhamel,
Attorney.

S. V. TSANOFF.
MOLD FOR BRICKS AND BLOCKS.
APPLICATION FILED MAR. 28, 1919.
1,338,468.
Patented Apr. 27, 1920.
2 SHEETS—SHEET 2.
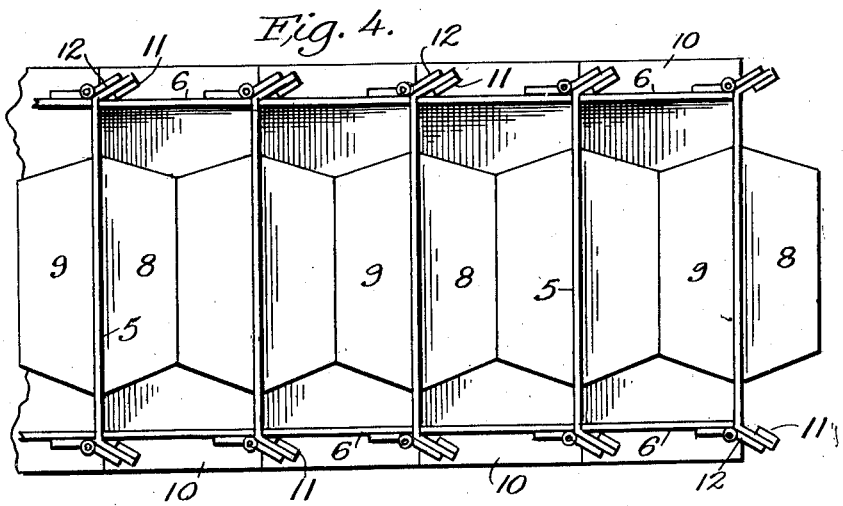
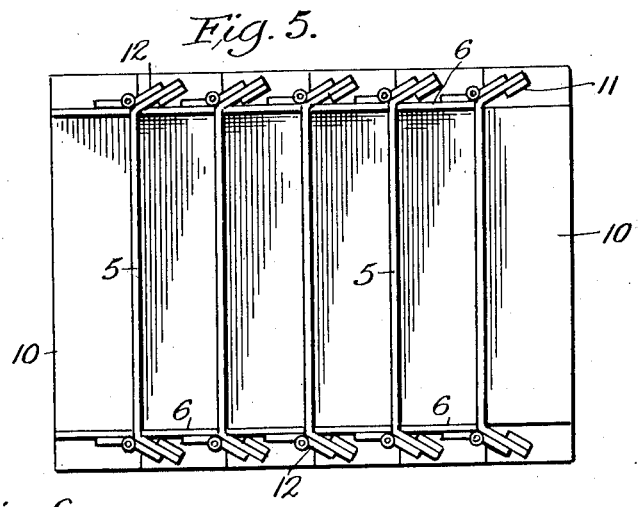
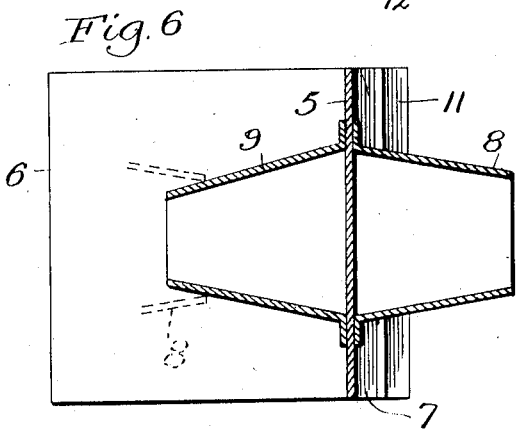
Inventor,
Stoyan V. Tsanoff,
By James F. Duhamel,
Attorney.

UNITED STATES PATENT OFFICE.

STOYAN V. TSANOFF, OF NEWARK, NEW JERSEY.

MOLD FOR BRICKS AND BLOCKS.

1,338,468. Specification of Letters Patent. Patented Apr. 27, 1920.

Application filed March 28, 1919. Serial No. 285,795.

*To all whom it may concern:*

Be it known that I, STOYAN V. TSANOFF, a citizen of the United States, and resident of Newark, in the county of Essex and State of New Jersey, have invented certain new and useful Improvements in Molds for Bricks and Blocks, of which the following is a specification.

This invention relates to molds for bricks and blocks of plastic material and either solid or hollow, and for the method of producing the same in molds consisting of identical units which are arranged adjacent to each other, two molds being used coöperatively to form one brick so that they may be separated and leave the brick exposed for drying upon the original base and the mold used for other products. These and other objects and details of the invention are more fully described in the following specification, set forth in the claims and illustrated in the accompanying drawings, wherein:

Figure 1 is a perspective view of one of the mold units.

Fig. 2 is a plan view of a series of molds mounted on pallets and ready to receive the plastic material.

Fig. 3 is a perspective view of a brick on its pallet and the molds removed.

Figs. 4 and 5 show modified constructions and uses of the device.

Fig. 6 is a vertical sectional view through one of the molds.

In the present invention the molds are identical and are adapted to be placed in a row, end to end, and when abutting to receive and contain the plastic material and where it remains until the material hardens or sets so the molds may be removed from around the brick.

While the drawings show the molds as being made of sheet metal it is obvious that other material may be used and they consist of plates 5 having at each side the hinged wings 6 and oblique flanges 7 which are reinforced with strips 11 so that they may not be bent or injured if struck repeatedly to release the brick or block.

From each side of the plate 5 extends cores consisting of truncated pyramids 8 and 9 and preferably hollow, the latter core 9 being longer than the core 8 and whose reduced end fits into the end of core 8, making a tight joint, or they may simply abut as shown in Fig. 4.

Each mold is adapted to rest upon a pallet 10 with rabbeted sides in which the wings 6 fit and when the adjacent molds are placed together, the wings are held in the rabbets by the adjoining flanges 7 as shown in Fig. 2 and a substantial structure is thus formed with appropriate supports at each end.

The plastic concrete, cement or similar material is poured into the molds until they are completely filled and then allowed to set.

In releasing the bricks the lower end plate with its core is removed from the row and the wings 6 about the first brick opened, the brick on its pallet is then drawn away from the rear core of said mold and leaving the latter at the rear of the next brick. If any difficulty is experienced in removing core 8 from the next brick blows may be struck the flanges 7 until the core is released and when the castings are drawn from the cores 9 they are located where they will dry or placed in a kiln.

The molds are identical and interchangeable and the proper distance between the wings is always maintained by the platform of the pallet while the flanges 7 can be relied upon to hold them in closed position to receive and hold the casting.

By this method of producing hollow bricks the interior walls are formed with inclined or tapering faces and a number of molds may be set in a row and the semifluid material be run into them as a continuous stream until all are filled and in due time the molds are stripped off, as above described, leaving the completed brick located on its original base until thoroughly dried.

Appropriate moldings may be provided in the wings or the plate 5 in order to give ornamental effect or interlocking or binding means to the block and the wings may be secured to the plates by other means than the hinges 12 if desired.

Fig. 5 shows how the molds may be made for slabs or solid blocks and how the cores can be dispensed with. They may also be arranged in rows of three side structures, the fourth side being the adjacent mold and mounted on pallets which space the wings apart.

It is obvious that the molds may be made of any thin metal or boards and could be otherwise constructed or modified without departing from the essential features above described or from the scope of the appended claims.

What I claim as new is:

1. In a mold, the combination of a plate carrying cores, of wings on the plate, and flanges to engage the wings of an adjacent mold.

2. In a mold, the combination of a plate constituting one side of the mold, cores on each side of the plate, flanges on one side of the plate, and movable wings at the other side of the plate.

3. In a mold, the combination of a plate having inclined flanges at its outer ends, cores extending from each side of the plate, hinged wings at the rear side of the plate, and a rabbeted board for the base of the mold.

4. In a mold, the combination of a plate having inclined flanges at its opposite edges, reinforced strips on the flanges, wings hinged at the base of the flanges, cores on each side of the plate and adapted to abut with the cones of the adjacent molds, and a rabbeted base for the mold.

5. In a mold, a frame of three sides having guide flanges adapted to coöperate with another similar frame to form the fourth side of said mold.

6. In a mold, a frame of three sides, one of the sides carrying cores, and adapted to coöperate with a similar frame to form a fourth side and complete the core for a hollow brick.

Signed at New York, in the county of New York and State of New York, March, A. D. 1919.

STOYAN V. TSANOFF.